United States Patent [19]

Schwaber

[11] E Patent Number: Re. 33,229

[45] Reissued Date of Patent: Jun. 5, 1990

[54] REMOTE DISPLAY DEVICE FOR A MICROCOMPUTER WITH OPTICAL COMMUNICATION

[75] Inventor: Jeffrey S. Schwaber, Maitland, Fla.

[73] Assignee: C.L.I.C. Electronics International, Inc., Orlando, Fla.

[21] Appl. No.: 272,950

[22] Filed: Nov. 18, 1988

Related U.S. Patent Documents

Reissue of:

[64] Patent No.: 4,763,291
Issued: Aug. 9, 1988
Appl. No.: 836,843
Filed: Mar. 6, 1986

[51] Int. Cl.[5] ..... H04L 11/02; G06F 13/00

[52] U.S. Cl. ..... 364/709.01; 364/710.01; 340/711; 434/118

[58] Field of Search ..... 340/706, 711; 364/710.01, 709.12, 709.11, 709.09, 709.01, 514; 434/118

[56] References Cited

U.S. PATENT DOCUMENTS

| | | | |
|---|---|---|---|
| D. 252,301 | 7/1979 | McCarty | D6/155 |
| 3,401,469 | 9/1968 | Shaver et al. | 455/603 |
| 3,838,412 | 9/1974 | Jones et al. | 340/706 |
| 3,976,995 | 8/1976 | Sebestyen | 340/706 |
| 4,154,007 | 5/1979 | Judd | 434/365 |
| 4,313,227 | 1/1982 | Eder | 340/711 |
| 4,409,665 | 10/1983 | Tubbs | 364/707 |
| 4,468,203 | 8/1984 | Gimmestad et al. | 434/365 |
| 4,516,216 | 5/1985 | Armstrong | 364/514 |
| 4,538,993 | 9/1985 | Krumholz | 434/118 |
| 4,600,918 | 7/1986 | Belisomi et al. | 340/711 |
| 4,628,541 | 12/1986 | Beavers | 455/603 |
| 4,649,373 | 3/1987 | Bland et al. | 340/711 |
| 4,652,240 | 3/1987 | Wackym | 434/118 |

FOREIGN PATENT DOCUMENTS

| | | | |
|---|---|---|---|
| 60-72062 | 4/1985 | Japan | 364/709 |
| 2084381 | 4/1982 | United Kingdom | 434/118 |

OTHER PUBLICATIONS

V. M. Rooney and A. R. Ismail, Microprocessors and Microcomputers, ©1984, Macmilan Publishing Co., pp. 226, 231-242.

*Primary Examiner*—Parshotam S. Lall
*Assistant Examiner*—S. A. Melnick
*Attorney, Agent, or Firm*—James H. Beusse

[57] ABSTRACT

A optically linked calculator system for displaying data generated by a local calculator at both the local calculator and at a detached display. The calculator system includes a plurality of transmitting calculators and receiving units. The receiving units include remote display receiving units and receiving calculators. Transmitting calculators transmit entered data and calculated results. Receiving units receive and display transmitted data entries and calculated results. A calculator includes a keyboard, keyboard logic, processing logic, display, display logic, transmit logic, infrared transmitter, switching means, infrared receiver receiver logic and converting logic. The switching means selectively enables components of the calculator for effecting a transmit mode, receive mode, and calculate mode. The remote receiver display unit includes an infrared receiver, data detection logic, processing logic, and a display.

9 Claims, 3 Drawing Sheets

SYSTEM BLOCK DIAGRAM, ONE-WAY RECEIVER

REMOTE DISPLAY DEVICE FOR A MICROCOMPUTER WITH OPTICAL COMMUNICATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to an optical link system for transferring data from a central processing site to a remote display site, and more particular, to a method and device for remotely displaying of data from a calculator.

2. Background Discussion

Only a few years after its introduction the electronic calculator has become a standard item. The functions of the calculator are simple, it accepts data from a keyboard, performs the required arithmetic, and shows the results on a display. The calculator's programs are stored in read only memories and the entered data are stored in random access memory.

In seminars or conferences where important calculations are made with a calculator, it is often desirable to remotely locate one or more data displays for observing data entries or calculated results for persons attending the meeting. By virtue of a person's physical location or proximity to the calculator, a person may not readily see the display data entries or calculator results on the calculator. For the benefit of those who may have an interest in the processing, it is desirable to display the data while the data are manipulated by a user of the calculator.

For instance, in a classroom setting it is desirable for a teacher to enter problems and solutions on a calculator keyboard and display the results on remote display units readily seen by pupils. This prevents the necessity of students from gathering around the calculator and allows each student to follow the calculator operation by the teacher. Another example, is in meetings where important calculations are done in which persons at the meeting have an interest in the results. It is also desirable for a person with a second calculator to transfer different data entries or calculated results back to the first calculator and remote display for comparisons.

It is also desirable to eliminate transmission lines between the calculator and remote displays. This permits faster installation of the calculator and displays, and allows a calculator user to move freely without the worry of becoming entangled. It would also benefit the persons in the meeting if the remote display could be easily moved from location to location without the need of connecting and reconnecting transmission and power lines.

It is therefore an object of the present invention to provide a remote display which automatically displays the data entries or calculated results from a calculator.

It is another object of the present invention to provide a remote display receiving unit to receive the data from the calculator and display it.

It is a further object of the present invention to eliminate the necessity of transmission lines between a calculator and a remote display.

It is an object of this invention to provide an optical link system for transmitting data from a calculator to a remote display unit.

It is another object the present invention to provide a portable, self-powered remote display receiving unit.

It is another object of the present invention to preserve power by selectively removing power from components of the calculator which are not needed.

It is a further object of the present invention to provide a calculator with a transmit mode, a calculate mode, and a receive mode, whereby the transmit mode transmits data over an optical link system while the calculator performs calculations, the receive mode receives data via the optical link system, and the calculate mode allows normal calculations to be displayed without transmitting and receiving.

SUMMARY OF THE INVENTION

This invention relates to an optical link system and method for communicating among a plurality of transmitting processing units and receiving units. The receiving units include remote display receiving units and receiving processing units. The processing units transmit data indicative of entered data and calculated results and receive data from transmitting processing units. The remote display receiving units receive and display transmitted data entries and calculated results.

A processing unit includes a keyboard, means for entering data from the keyboard into the processing unit, a display means, a converting means, a transmission means, and a receiving means. The display means connects to the processing unit for displaying locally calculated results or data entries. The means for converting transforms data entries or calculated results into electrical signals which are transferred to the optical transmission means. The optical transmission means converts the electrical signals into pulses of radiation representative of the electrical signals. The receiving means accepts radiation from other transmitting processing units.

Each processing unit includes a switch means for selecting a transmission mode, a reception mode, and a calculation mode. In the transmission mode the processing means when performing calculations, transmits entered data and calculated results to other receiving units. In the reception mode, the processing means receives data from the optical link for displaying on its display data calculated or entered from a transmitting processing unit. In the calculation mode, the processing unit functions as a normal calculator without transmitting or receiving data.

A remote display device includes a receiving means for receiving the pulses of radiation and converts the electrical signals thereof to a displayed value which represents the data displayed on the transmitting processing unit.

DETAILED DESCRIPTION OF THE DRAWINGS

The foreground aspects and other features of the invention are explained in the following description, taken in connection with the accompaning drawings, wherein.

DETAILED DESCRIPTION OF AN ILLUSTRATIVE EMBODIMENT

1. General Description

With reference to the drawings in general, there is illustrated a method in one form of the invention of remotely displaying data from a calculator. In this method, a calculator transfers data via an optical transmission link system to a receiver calculator or a remote display. While the present invention is described hereinafter with particular reference to a calculator, it is to be understood at the outset of the description which follows that the devices and methods in accordance with the present invention may be used to transfer display information from general purpose processing units. These include but are not limited to various microprocessors and microcomputers well known in the art.

Figure 1:
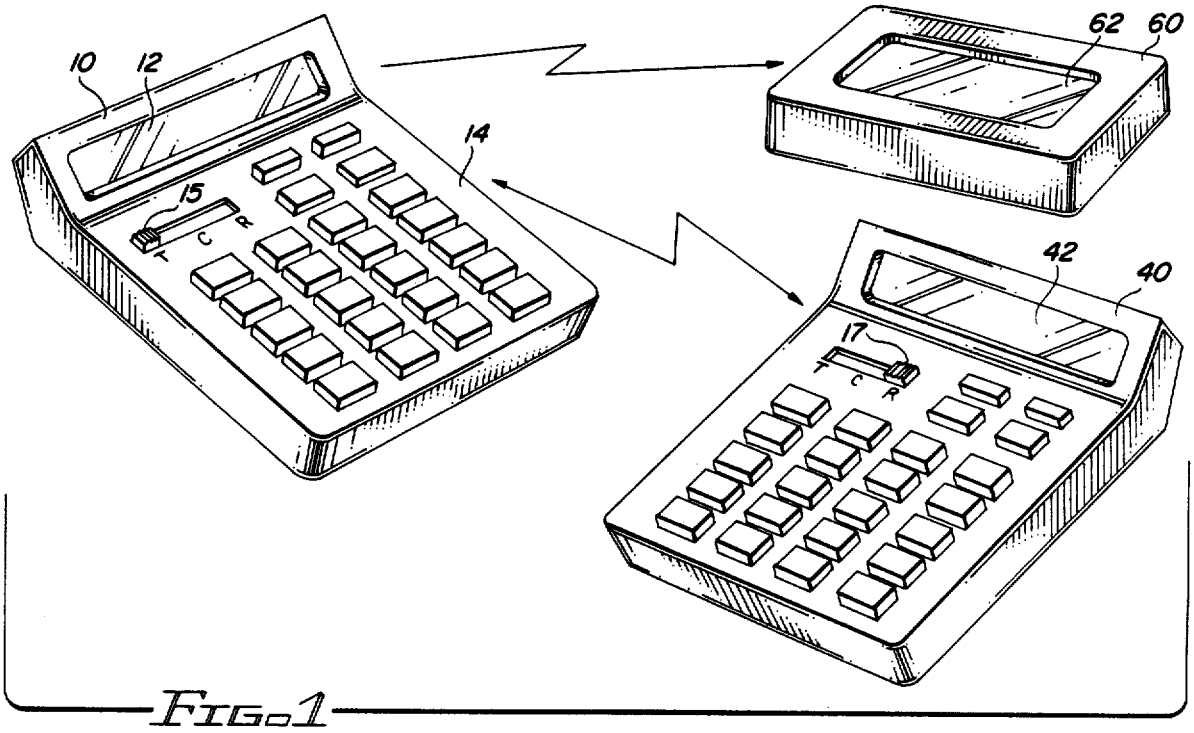
FIG. 1 shows a general system overview for the method of remotely displaying data for a calculator.

FIG. 1 shows a general system overview for the method of remotely displaying data for a calculator. The calculator 10 performs calculations on data entered into its keyboard 14 in a manner well known in the art, and displays the data on a local display 12. The calculator 10 operates in either a transmit mode, a receive mode, or a calculate mode depending upon the position of a three way switch 15. In the transmit mode, calculator 10 performs normal calculations and the data in the local display 12 are transmitted to a plurality of remote display units, such as remote display unit 60 and calculator 40. The data on local display 12 are transferred via an optical link to calculator 40 and remote display 60. In the receive mode, calculator 10 receives data via the optical link from a transmitting calculator. In the calculate mode, calculator 10 performs normal calculations in a manner well known in the art. In the calculate mode, no data are transmitted.

For purposes of illustration, calculator 10 transmits, and calculator 40 receives. It is important to note that calculator 10 also receives if switch 15 is in the receive mode. Calculator 40 transmits if switch 17 is in the transmit mode. The data transmitted by calculator 10 are received by calculator 40 and displayed on its local display 42. Calculator 40 performs in the same matter as calculator 10 and is able to effect transmission to calculator 10 of data displayed on its local display 42. Thus, calculator 40 also transmits data to a calculator 10 for display on local display 12.

Calculator 10 also transmits via the optical link to a remote display unit 62 which includes a remote display 60. The remote display 60 receives the transmission from calculator 10 and converts the transmission data into a form suitable for displaying on local display 62. The optical link includes a plurality of optical transmitters and optical receivers.

Figure 2:
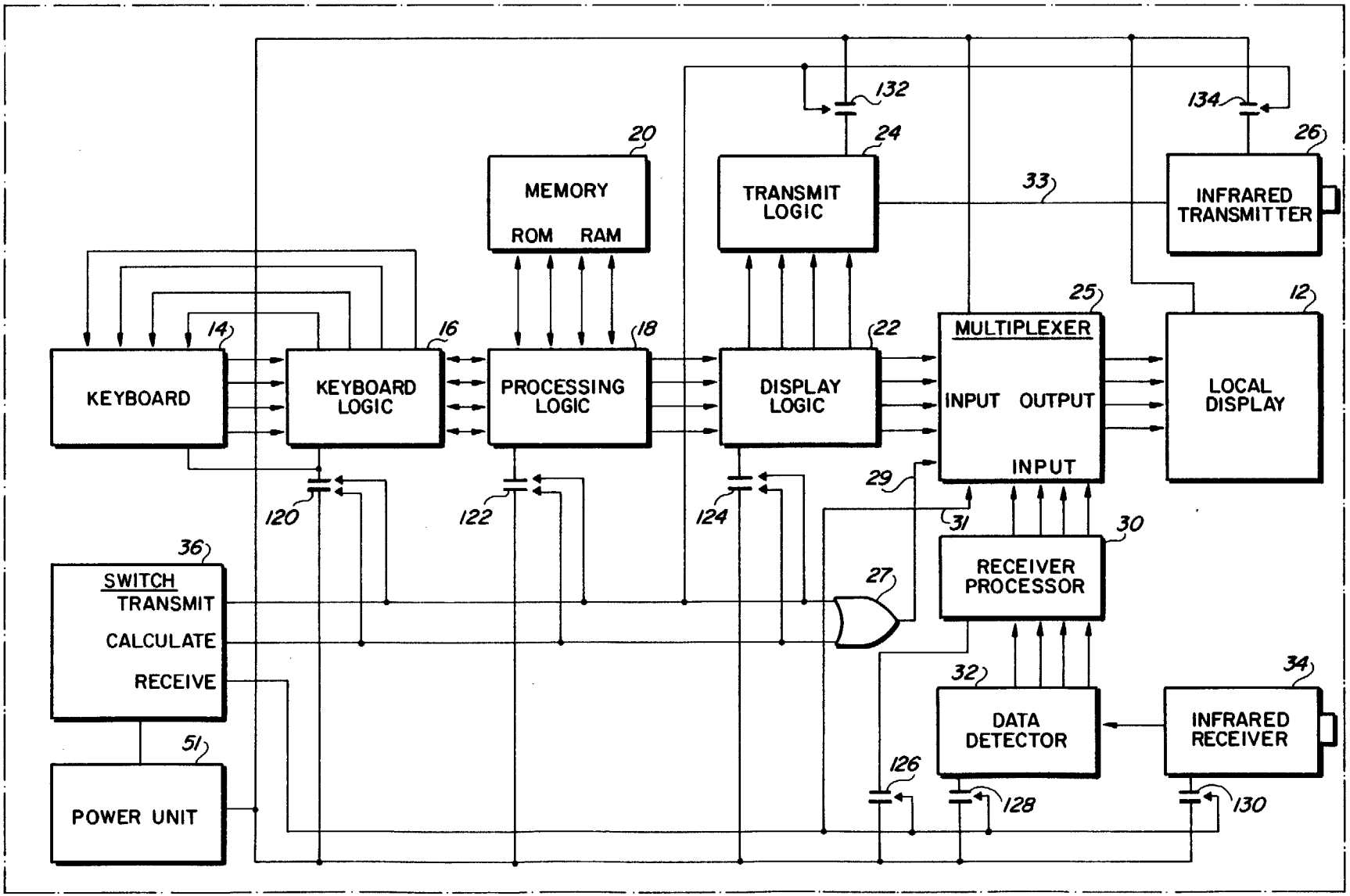
FIG. 2 is an electrical block diagram for a processing unit.

FIG. 2 shows a system block diagram for from calculator 10. Calculator 10 includes an optical transmitter such as infrared transmitter 26 for transmitting data and an optical receiver such as infrared receiver 34 for receiving data. The infrared transmitter 26 transmits in the infrared spectrum and includes at least a single infrared emitting device. This device emits radiation just above the visible light spectrum between 770 nanometers and $10^6$ nanometers. Gallium Arsinide and Gallium Aluminum Arsenide are two currently available compounds that are used for producing infrared emissions. These types of devices are commonly used in remote television controls. Depending upon the input power these devices can transmit up to distances of fifty feet. To increase the distance the input power can be increased accordingly. The beam from the infrared transmitter is in the form of a cone with the infrared emitting device located at the apex of the cone. To broaden the beam width more than one infrared emitting device is used. Thus, the infrared transmitter is able to transmit to a plurality of infrared receivers independent of its orientation, as long as an infrared receiver is located within the cone of reception. Increasing the cone of reception is accomplished by increasing the power input and increasing the number of infrared emitting devices. The infrared emitting devices of the infrared transmitter are synchronized in a manner well known in the art. The infrared receiver 34 is sensitive enough to detect the emitted radiation.

Calculator 10 includes a keyboard 14, keyboard logic 16, processing logic 8, memory 20, display logic 22, transmit logic 24, infrared transmitter 26, multiplexor 25, receiver processor 30, data detector 32, infrared receiver 34, and display 12. Entries are made into calculator 10 by virtue of keyboard 14 which represents a unique pattern of key locations and labels according to particular industry conventions. Special key functions are created according to their intended use which presents an advantage in time, or function to the user, thereby offering a uniqueness not found in a generic mathematically orientated calculator.

The memory 20 contains electrical elements (random access memories) which retain the digital representation of the mathematical operations performed by the logic 18. It also contains specific software routines in read only memory (ROM) necessary to effect functional operations and instructions necessary for operating the processing logic 18 according to a format of the microprocessing requirements of the processing logic 18. Memory 20 provides for bidirectional information exchange and for storage devices for support of the processor logic 18.

The display logic 22 provides the necessary electrical and logical interfaces between processor logic 18 and the local display unit 12. The electrical representations of the resulted logic and mathematical operations performed in the processor logic 18 are presented to the display logic 12 for formating, which enables the direct viewing by the user's local display 12. The local display 12 can be a LED, LCD, vacuum fluorescent, video scan or other commonly used data displays.

The display logic 22 converts the electrical signals from processing logic 18 in such a matter as to cause appropriate characters to appear on local display unit 12 through multiplexor 25. The display logic 22 stores each individual character representation of a larger number or word being displayed and sequentially presents them in a repeating fashion to the display unit 12, while simultaneously activating the respective individual display character locations in which the specified character appears.

The display unit 12 performs necessary conversion between the electrically represented characters and a user by visual methods. Light emitting diodes (LED's) are among many of the devices and techniques utilized in commonly accepted and commercially available packages, which can be arranged in segmented lines or dots in such a manner as to represent characters by approximation of their shape and orientation. In the case of an LED format display, as the electrical signals are applied to the segments or dots, each in turn illuminates. By proper and prior determination of specific individual segments or dots being illuminated, the display logic 22 causes a character to be shown by a specific segment or dot grouping. Similar adaptations or display guidance arrangements are made for other display techniques and adaptations and display guidance arrangements are made for other display techniques.

The transmit logic 24 interfaces between the processing logic 18, display logic 22 and the infrared transmitter 26. The processing logic 18 electrically transmits data to transmit logic 24 in parallel form, with each individual data bit occupying a unique position and polarity. The character thus presented is thus defined by a parallel arrangement of these data bits. The transmit logic 24 converts from a parallel data format to a serial data format while maintaining a position of polarity integrity of a data bit representation. The parallel data word composed of all of the data bit elements is applied to the parallel input of a shift register element contained within transmit logic 24.

The stored data word is then caused by the function of the internal system clock to be sequentially transmitted in serial fashion by the shift register. Each individual data bit is sent in sequence to the infrared transmitter 26 for transmission. The data word is altered prior to transmission according to a predetermined formula for insuring its transmission integrity. A typical method is asynchronous serial data transmission as used in the data communications and telecommunications industry, and is employed using commonly accepted methods of encoding resident and commercial logic unit circuits, such as a universal asynchronous receiver and transmitter (UART).

With asynchronous serial data transmission, each serial character transmitted consists of three parts: a start bit, data bits and a stop bit. A start bit is a line state that lasts for one-bit time and indicates the beginning of the character. After the data bits are transmitted, a stop bit is sent. Asynchronous serial data transmission technique is well known in the art of data transmission.

Data are loaded from processing logic 18 into a transmitter holding register of transmit logic 24 whenever the register is empty, which is signified by register empty signal. Circuitry internal to the transmit logic 24 automatically loads new data into the transmitter whenever it is ready. The start and stop bits are then added to the data, and a serial transmission is initiated to the infrared transmitter 26. Control lines permit control of the loading and transmission process by the processing logic 18.

The infrared transmitter 26 accepts as its input the serial data stream from the transmit logic 24 and generates coded radiation pulses representatives thereof. The radiation output lies in the infrared spectrum and is enabled in response to the electrical polarity of the data being transmitted on a bit by bit basis. The infrared transmitter 26 includes a single element or series of elements which comprises infrared emitting devices.

A switch 36 selectively controls the power to elements of the calculator 10. If the switch is in the transmit position, power is enabled to the keyboard 14 and keyboard logic 16, processing logic 18, memory 20, display logic 22, transmit logic 24 and infrared transmitter 26. In the calculate mode the switch enables power to the keyboard logic 16 and the keyboard 14, process logic 18, memory 20, and display logic 22. In the receive mode the switch enables power to the receiver processor 30, the data detector 32, and infrared receiver 34. Power is constantly applied to multioplexor 25 and local display 12, since both these elements are used in the transmit, calculate or receive mode.

Power unit 51 energizes each element of calculator 10 through power contactors 120–134. In the normal state, all power contactors are open de-energizing the elements of calculator 10. positioning switch 36 to the receive mode, enables power contactors 126–130 for energizing the receiving circuit. Placing switch 36 to the calculate mode enables power contactors 120–124 providing power to keyboard 14, keyboard logic 16, processing logic 18, memory 20, and display logic 22. Positioning switch 36 to the transmit mode enables power contactors 120–124 and 132–134 for providing power to the calculating circuitry, transmit logic 24, and infrared transmitter 26. Thus, the power contactors disable elements of the system not needed during operation for conserving energy of the power unit 51. The power contactors can be of numerous types such as relays, reed switches, etc., well known to those of ordinary skill in the art.

Switch 26 also selects which inputs of multiplexor 25 are applied to the outputs of multiplexor 25. In the calculate mode multiplexor 25 is configured so that processing logic 18 works as a normal calculator. In the transmit mode, the data transmitted is also displayed on display 12 by multiplexor 25. In the receive mode, multiplexor 25 is selected so that data received by infrared receiver 34 is shown on display 12.

When the calculator 10 is switched to the receive mode, the infrared receiver 30 collects infrared signals emanating from an infrared transmitter from a transmitting processing unit and converts them to electrical signals represnting the originally transmitted data bits, by altering its receiver output and response to incoming presence or absence of coded infrared pulses. The basic element of the infrared receiver 34 is a photo diode or phototransistor device, either as a single unit or an array of units. The stream of serial coded infrared pulses, alternating polarity, is applied to the data detector 32 where it is examined for position and format integrity in a corresponding manner to its encryption by a transmit logic unit 24.

The serial coded data bits are presented in parallel form by the data detector 32 to the receiver processor 30. The receiver processor 30 arranges the data in a format similar to that of display logic 22 and sends the data in parallel fashion to multiplexor 25. In the receive mode, multiplexor 25 connects the outputs from receiver processor 30 to the local display 12 for displaying received data. In the transmit mode and calculate mode multiplexor 25 is connected to display logic 22 for displaying transmitted data and calculated data.

In order for a remote display receiver to properly recover data being sent by an infrared transmitter the data bits are transmitted in data character groups of 8 bits in length and synchronizing start and stop bits are added to each character. The start bit is a single logical zero data bit that is added to the front of each character. The stop bit is composed of two logic 1 data bits added to the end of each character. The logic 1 level is mantained until the next data character is ready to be transmitted. Asynchroneous data transmission is different from synchronous methods which require that data being sent be contiguous and be utilized to reconstruct a system clock signal used in its own data recoding process. It is functionally advantageous to utilize asynchronous data transmission since it does not require that a synchronous clock be transmitted with the data transmission and thereby permits the reception circuitry to be greatly simplified. It is additionally advantageous that the data need not be contiguous in time, but may be transmitted as it becomes available. This is particularly relevant due to the manual data entry via the keyboard 14.

Power is supplied to the operating circuits by means of an internal battery supply or by an AC power supply package.

Figure 3:
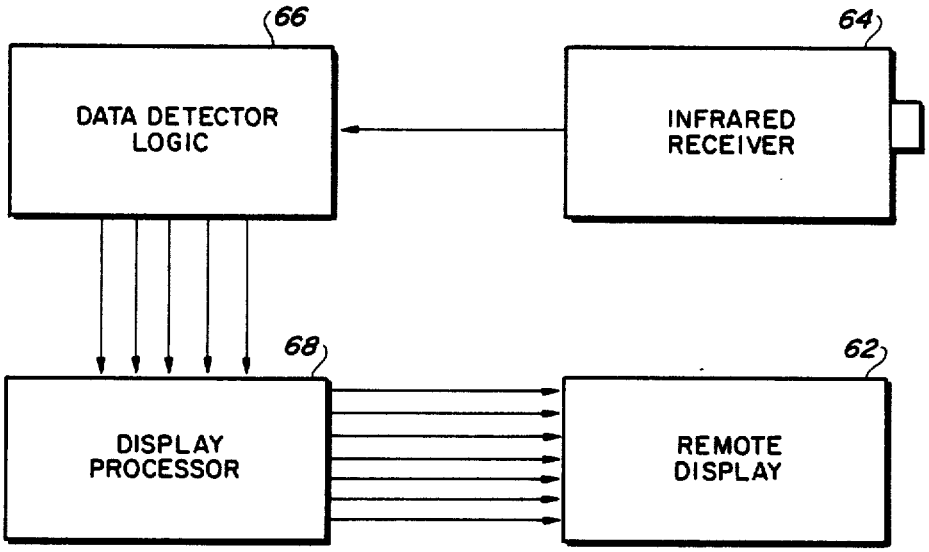
FIG. 3 is an electrical block diagram for a remote display receiving unit.

FIG. 3 shows a system block diagram for the remote display. An infrared receiver 64 collects infrared signals emitting from infrared transmitter 26 and converts them to electrical signals representing the originally transmitted data bits, by altering its receiver output in response to the incoming presence or absence of coded infrared pulses. The basic element of the infrared receiver 64 is a photo diode or photo transistor device either as a single unit or an array of units.

The stream of coded infrared pulses, alternating in polarity, is applied to the data detector logic 66 where it is examined for position and format integrity in a corresponding manner to its encryption by the transmitting device. Internal to the data detector logic 66 a start bit detect circuit continually searches for logic 1 to 0 transmission while in the idle state. When detected a counter is reset and allowed to count until the center of the start bit is located. The level of incoming data bit is again tested to ascertain its logical polarity. If the logical level is still low, representing a 0, the signal is assumed to be a valid start bit, and the counter continues to count to find the center of all subsequent data stop bits. Verification of the start bit presents an advantage which prevents the receiver from assembling an erroneous data character when a logical 0 noise burst or spike is presented to the receiver input.

As each receive character is transferred to a holding register of the data detector logic 66, control logic signals the display processor logic circuits that a character is ready for reading. An internal clock circuit is crystal frequency controlled for accuracy and stability and is used for the timing of all functions within the data detector logic 66. Additionally the internal clock frequency is sixteen times that of the comparable speed of transmission and is divided by sixteen within the data detector logic 66. This results in greater accuracy of determination with respect to locating the exact center of any data bit. Errors, if they occur, are detected and processed along with the intended data and a displayed as question marks on the final display to the viewer. Circuitry used for the decoding process in the data detector logic 66 is the same as that utilized in the data detector logic circuits contained in the transmitter processing unit.

The serial recovered data bits are presented in parallel form by data detector logic 66 to the display processor 68 of the remote infrared receiver unit. The data is arranged and set in a format similar to the case of the transmitter unit. The display processor 68 may take the form of a microcomputer which is coupled by a instruction/data bus to each of a read only memory (ROM) and a random access memory (RAM). The ROM is adapted to store instructions which the display processor 68 executes to detect and recognize the received data from the infrared receiver 64. The display processor 68 processes these signals for storage in memory or display on the remote display 62. The data is decoded and fed in parallel to remote display 62. The remote display 62 presents a display of the transmitted data. Thus, the remote display 62 will have the same data displayed as that of the transmitting processing unit. Power provided to the remote display unit is by internal battery or AC power supply.

2. Processing Unit

A. Calculator

Figure 4:
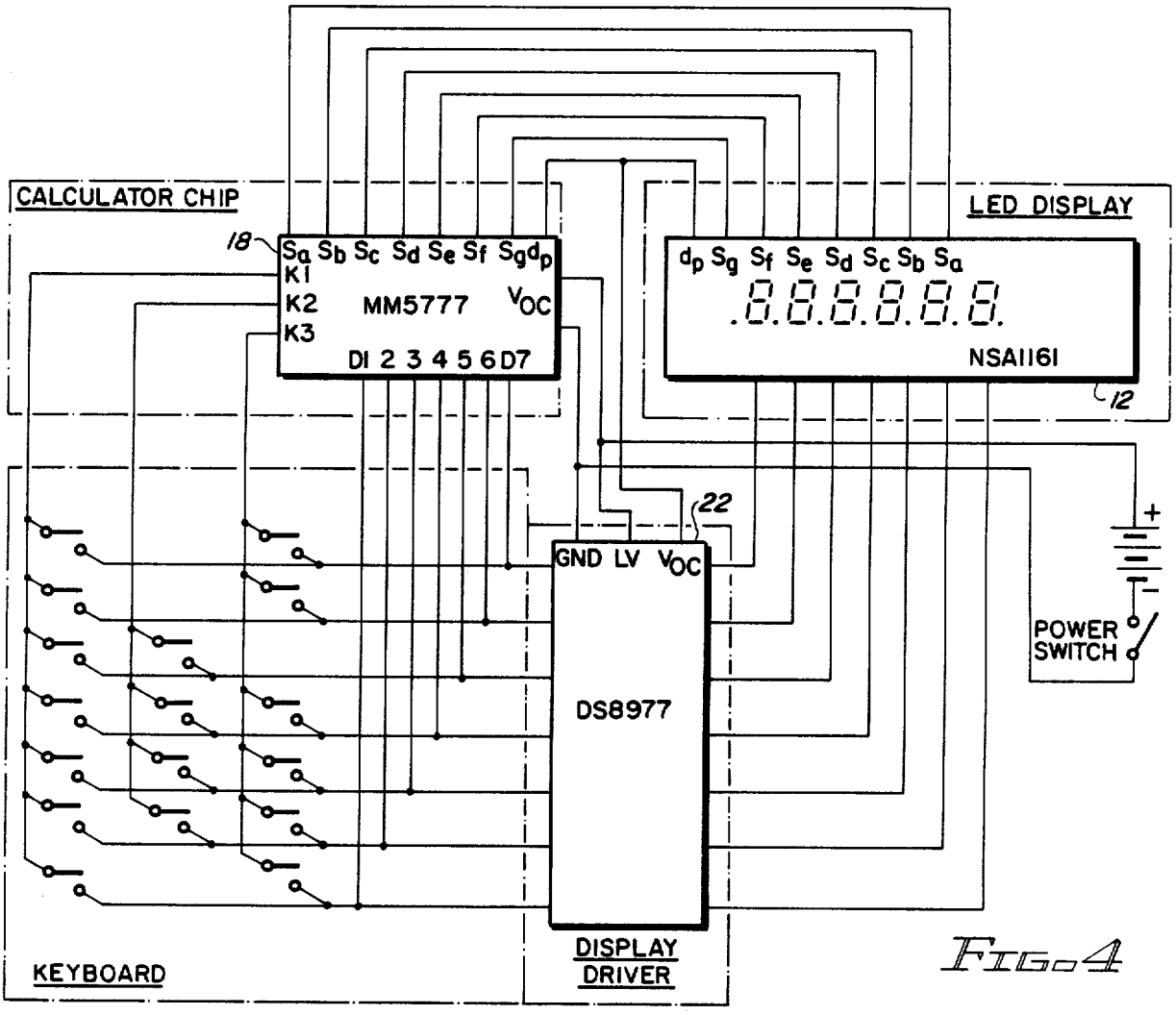
FIG. 4 is an electrical schematic drawing of a calculator.

FIG. 4 shows an electrical schematic drawing of a typical calculator used in the practice of the present invention. Processing logic unit 18 interfaces with keyboard 14. A key closure is sent by logic 18 when one of the key input lines, K1, K2 or K3 is forced more positive than a logical high level. At the instant of closure, an internal key bounce out stability time counter is started. Any significant voltage perturbation occurring on the switch key input during timeout resets the timer. Hence, a key is not accepted as a valid entry until noise or ringing is stopped and the stability time counter has timed out. Processing logic 18 provides for at least a 6 digit entry and display capacity for positive and negative numbers, at least four functions of addition, subtraction, multiplication and division, floating point input and output, algebraic key entry notation, chain operations, direct interface to a LED display, overflow and divide by zero error indication, and right justified entry and results with leading and trailing zero suppression. Processing logic 18 includes memory 20 used for performing required algebraic and mathematical manipulations. The processing logic 18 as used by applicants in the practice of this invention is a model MM5777 calculator manufactured by National Semiconductor Corporation.

B. Keyboard and Keyboard Logic

Keyboard 14 operates by causing switch closures to occur beneath individual keys depressed by a user. A switch closure connects two close proximity tracelines together, during a time interval in which the key is held depressed by the user. The two trace lines are physically and electrically located so as to form a matrix of rows in column. Thus when a connection is made a particular row is connected to a particular column which uniquely corresponds to a particular calculator function or a character on the keyboard.

The keyboard logic 16 causes an electrical signal to by systematically, and sequentially applied to only one column trace at a time, while internally recognizing which column trace is being currently activated. In a similar manner it electrically monitors each row trace and internally recognizes which row trace is being currently monitored. The resulting key depression and its effected switch closure and resulting electrical connection, between its unique column and row trace, is electrically sensed by the keyboard logic circuitry 16 since this switch closure results in the application of an electrical signal from its unique column trace to its unique row trace thus being sensed and recognized during the scanning process described above.

The uniquely representative function or character represented by its respective row/column electrical determination is applied to the processing logic 18 for further involvement of the overall calculator operation. Resident within the processing logic circuitry are hardware and logic circuits which perform mathematical operations on the data entered by the user. These operations and the results are stored and manipulated as needed to effect functions of specific natures applicable to the particular calculator style being used.

C. The Display Driver

The display driver 22 is a driver for a 7 segment display 12. The display driver 22 converts a BCD decade to a corresponding 7 segment display digit for display 12. Display driver 22 accepts a BCD decade as input from processing logic 18 and converts it to an output for illuminating the proper segments of a 7 segment display. The digital display driver as used by the applicant is a model DS8977 manufactured by National Semiconductor Corporation.

The display logic 22 controls the overall brightness of the display by effecting the time duration during which each display character is "on". By causing the duration to increase, a character is perceived to be brighter as the human eye will average its perception between the "on" time "off" time, with the result and appearance of average brightness. This methodology reduces the power consumption of the calculator unit as a whole, since a continuous display necessitates the application and consumption of greater amounts of power as compared to an average power consumption divided between "on" and "off" times.

D. Multiplexor

The multiplexor 25 funnels signals from either display logic 22 or receiver processor 30 to local display 12. The inputs to multiplexor 25 are from either display logic 22 or receiver processer 30 which are selected by signals on select lines 29 and 31. The outputs from multiplexor 25 are connected to the inputs of local display 12. The signals on lines 29 and 31 are generated from switch 36. If switch 36 is in the receive position the signal on line 31 selects inputs from receiver processor 30 for connection to the outputs of multiplexor 25. In the receive mode, therefore, display data generated by processor logic 30 is applied to local display 12.

In the transit mode or calculate mode, the output from display logic 22 is applied to local display 12. The transmit signal from switch 36 is applied to one input of OR gate 27. The calulate signal is applied to a second input of OR gate 27. The output of OR gate 27 is applied to a select input of multiplexor 25. If a transmit or a calculate signal is present the output signal of OR gate 25 selects the display logic inputs of multiplexor 25 to be applied to the inputs of local display 12. Thus, in the transmit mode or calculate mode the output from display logic 22 is applied to the inputs of local display 12. Essentially, multiplexor 25 switches to inputs from receiver processor 30 in the receive mode to inputs from display logic 22 in the transmit or calculate mode.

E. Local Display

The display 12 as illustrated is a 7 segment digital display driven by display logic 22. The 7 segment display displays numbers between 0 and 9 and decimal points along with a 7 digit used for the negative sign of a 6 digit number and as an error indicator. Negative results less than 6 digits have the negative sign displayed one digit to the left of the most significant digit. The display as used by the applicants in the practice of this invention is a model NSA1161 display manufactured by National Semiconductor Corporation.

The 7 digit display uses monolithic digits and has up to 9 digits. These devices are common cathode GsAsP LED, with nominal 0.100 inch character height. Each digit comprises 7 segments with a righthand decimal point. Eight inputs provide for selection of the appropriate segments and decimal (anodes) and separate inputs for digit (cathodes) selection. The anodes are internally interconnected for multiplexing. A clear lense on the display provides light transmission and ease of visability over a wide angle. The digital display as utilized by applicants in this invention is a model NSA1100 series 0.100 inch nine digit LED display, manufactured by National Semiconductor Corporation.

F. Transmit Logic

The transmit logic includes a universal asynchronous receiver transmitter (UART). The transmit logic 24 is a general purpose programmable device. Display Transmit 24 converts parallel data from display logic 22 to a serial data format on transmission line 33 to drive the infrared transmitter 26.

The serial format in order of transmission and reception is a start bit, followed by five to eight data bits, a parity bit and two stop bits. The transmitter operates on the clock signals from processing logic 18. The transmitter is double buffered allowing one character to be loaded while transmitting another. The inputs and outputs are TTL compatible. The transmit logic used in the practice of the present invention is a model TR1402/TR1602 universal asynchronous receiver/-transmitter as manufactured by the Western Digital Corporation. For a better understanding of the configuration and functional cooperation of the components described above, attention is directed to the discussion of the data detetor, wherein the respective components are illustrated in detail.

G. Infrared Transmitter

The infrared transmitter 26 includes a GaAs infrared emitting diode designed for emitting radiation at wave length in the near infrared range. The radiation emitted is excited by current flowing in a forward direction which can be modulated. The infrared transmitter has a beam width of 25 degrees, with a power output of 16 mW and an intensity of at least 16 mW/sr. The infrared transmitter accepts the serial bits from the transmit logic and produces a plurality of pulses representative of the serial buts in a manner well known in the art.

H. Infrared Receiver

The receiver portion of calculator 10 includes an infrared receiver 34, a data detector 32 and a receiver processor 30. The infrared receiver 34 may take the form of a planar photo silcon photodiode. The photodiode is capable of receiving the wavelength of the infrared transmitter 26 and is sensitive enough to detect the transmission from the infrared transmitter in a large meeting room. The photodiode used in the practice of this invention is a model DPX93 photodiode manufactured by Litronix Company.

I. Data Detector

The data detector is a universal asynchronous receiver which converts the asynchronous serial data from the infrared receiver 34 to parallel data for transferring to the receiver processor 30. The data detector 32 is double buffered allowing one character to be read while the second character is being transformed to parallel output to the receiver processor 30. The data detector 32 monitors three types of errors caused by transmission: a parity error which indicates that the receive parity differs from that which is expected from infrared transmitter 26; a framing error indicating that the received character has no valid stop bit; an overrun error indicates a data received flag was not reset before the next character was transferred to the receiver processor 30.

Figure 5:
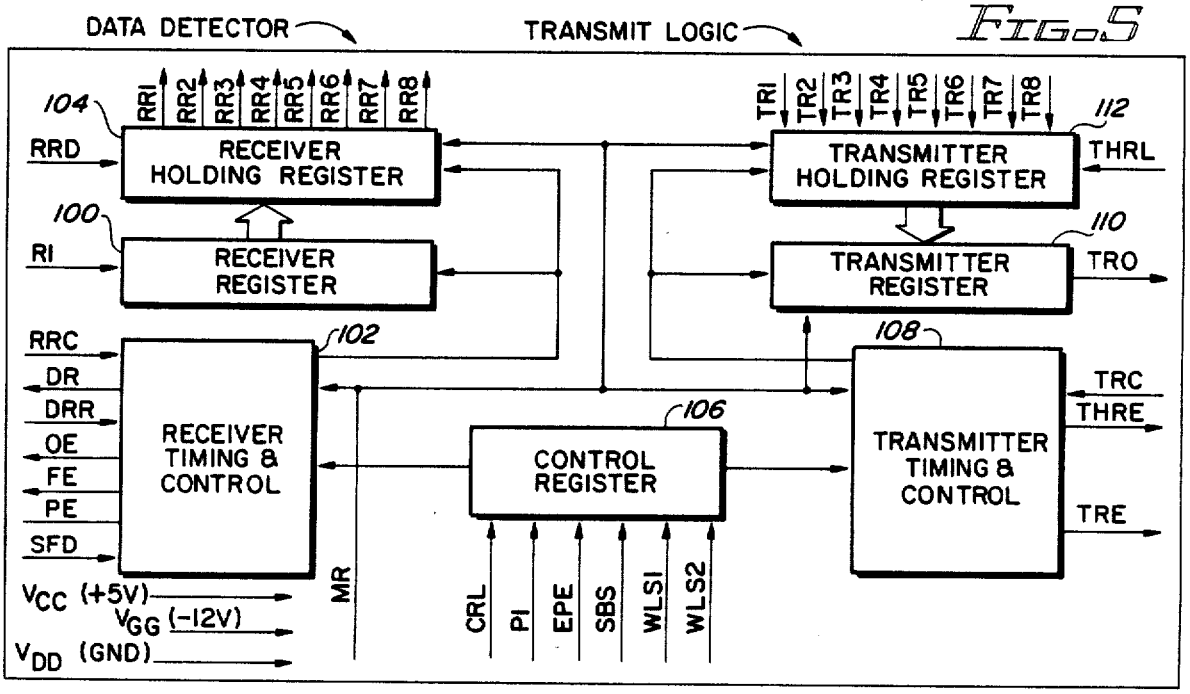
FIG. 5 is an electrical schematic drawing of a data detector/transmit logic.

FIG. 5 is an electrical schematic drawing for a data detector/transmit logic unit. As a data detector, serial data is received by receive register 100 from the infrared detector. A control register 106 activates the receiving and timing control 102 for transferring the serial data in receiver register 100 to the receiver holding register 104. The receiver holding register 104 inludes 8 parallel lines to transmit the bit configuration in receiver holding register 104 to the receiver processor.

In the transmit configuration, control register 106 activates the transmitter timing and control logic 108. Parallel data from a display logic unit enters into a transmitter holding register 112 via 8 parallel lines, TR 1 through 8. Under command from the transmitter timing and control unit 108, the transmitter holding register transfers the parallel bit configuration it contains to a transmitter register 110. Under commands from the transmitter timing and control unit 108 the transmitter register shifts the bit configuration contained within in a serial manner on line TR 0 to the infrared transmitter for transmitting to remote receiving units. Data detector 32 and receiver processor 30 are interfaced in a manner well known in the art for transmitting data from a parallel interface device to a microcomputer.

J. Receiver Processor

The receiver Processor 30 includes a microcomputer which converts the parallel data from data detector 32 and transfers the data to multiplexor 25 for driving local display 12. The microcomputer 30 contains the necessary hardware and logic for converting the parallel data from data collector 32 to a compatible level for local display 12. It is understood that receiver processor 30 has its own internal clock, as is well known in the art for controlling its internal operations, as well as interfacing with data detector 32 and multiplexor 25. The receiver processor 30 includes a read only memory and a random access memory. The random access memory is adapted to store instructions which the receiver processor 30 executes for detecting or recognizing input signals from data detector 32, for processing these signals, converting the data to an appropriate level for local display 12, and storing the data in designated areas of the random access memory. The programs or routines as stored in the read only memory convert the data from the data detector 32 to an appropriate level for local display 12 in a manner well known in the art. The microcomputer used by applicants in the practice of this invention is a model Z8601 manufactured by the Zilog Corporation.

3. REMOTE DISPLAY RECEIVING UNIT

Referring back to FIG. 3, FIG. 3 is a electrical block diagram for a remote display receiving unit. The remote display receiving unit 60 includes an infrared receiver 64, a data detector logic 66, a display logic 68 and a display unit 62.

A. Infrared Receiver

The infrared receiver 64 may take the form of a planar silicon photo diode. The photo diode is capable of receiving the wavelength of a infrared transmitter from a processing unit with a sensitive enough to detect the transmission from the infrared transmitter in a large meeting room. The infrared receiver 64 is identical and operates infrared receiver 34 of the calculator.

B. Data Detector Logic

The data detector logic 66 is a universal asynchronous receiver transmitter (UART) which converts the asynchronous serial data from the infrared receiver to parallel data for transferring to the receiver display logic 68. The data detector logic 66 is identical and operates as that described with respect to data detector 32 of the calculator.

C. Display Processor

The receiver display processor is a microcomputer which converts the parallel data from the data detector logic to signal to drive the 7 segment display unit 62. The microcomputer contains the necessary hardware and logic for converting the parallel data lines to a display on the display unit 62. The microcomputer used by applicants in the practice of this invention is a model Z8601 manufactured by the Zilog Corporation. The microcomputer is identical and operates as receiver 30 of the calculator.

Thus it has been shown an optical link for remotely displaying data from a calculator. The link includes a plurality of transmitting processing units and remote receiving units. The remote receiving units include receiving processing units and remote display receiving units. Entered data and calculated results of a transmitting processing unit are transmitted to remote receiving units for displaying the data.

The above described embodiment of the invention is illustrative only, and modifications thereof may occur to those skilled in the art. Accordingly, this invention is not to be regarded as limited to the embodiment disclosed therein, but is to be limited as defined by the appended claims.

I claim:

1. In a infrared linked network for receiving and transmitting data between a plurality of devices, each device having at least an infrared receiver for receiving pulses of infrared transmission, an infrared transmitter for atmospherically transmitting pulses of infrared transmissions, a calculator for performing calculations from data and command functions entered via a keyboard attached thereto, and a display for exhibiting data and calculated results, a method for displaying data generated at each device or received from another of the devices comprising the steps of:

(a) generating electrical signals from a calculator in one of the devices representative of entered data and calculated results;

(b) transforming the electrical signals to a series of electrical pulses;

(c) applying the electrical pulses to an infrared transmitter in the one of the devices for generating a series of atmospherically transmitted infrared pulses;

(d) receiving the atmospherically transmitted infrared pulses with an infrared receiver in at least one other of the devices and generating a series of electrical pulses representative of the received infrared pulses;

(e) converting the series of electrical pulses to display signals for the display to exhibit the received data;

(f) operating on the received data at said at least one other of the devices in accordance with data and command functions entered into the calculator associated with said at least one other device to obtain further results;

(g) converting said further results into further electrical signals suitable for infrared transmissions; and (h) transmitting said further electrical signals to at least another said one of the devices for displaying said further results thereat.

2. An optically linked portable calculator system comprising:

a first calculator unit having a keyboard for manually entering data and command functions into said first calculator, processing means responsive to data and command functions entered into said calculator for operating thereon to generate corresponding results in a digital data format and display means coupled to said processing means for displaying said data and command functions and said results in a human readable form, said first calculator further including optical means for converting said digital data formatted results into atmospherically transmitted pulses of optical radiation within a predetermined optical frequency range;

at least one detached remote calculating means having a local keyboard for manually entering local data and command functions, a local processing means for receiving local data and command functions and for operating thereon to generate corresponding local results, a local display means coupled to said local processing means for displaying results obtained from said local processing means, said at least one remote calculating means further including optical means for receiving atmospherically transmitted pulses of optical radiation within the predetermined optical frequency range, said optical means converting received pulses into digitally formatted data and command functions for application to said local processing means, said local microcomputer means causing said data and command functions to be displayed on said local display means; said first calculator unit and each of said at least one detached remote calculating means including means for reversing the function of its respective optical means to either a transmit or receive mode for permitting signal transmission between said first calculator unit and; and at least one detached remote calculating means means in each said first calculator unit and said at least one detached remote calculating means for selectively displaying data and command functions from its associated keyboard and from optically received pulses from said first calculator unit or said at least one detached remote calculating means.

3. The system of claim 2, wherein said optical means comprises at least one infrared transmission element and at least one infared receiving element.

4. The system of claim 2 wherein said reversing means and said selectively displaying means comprises switching means mounted on each said first calculator and at least one detached said remote calculating means for respectively selectively placing said first calculator and said at least one detached remote calculating means into one of a transmitting and receiving mode.

*5. An optically linked data processing system comprising:*

*a first processing unit having a keyboard for manually entering data and command functions into said first processing unit means responsive to data and command functions entered into said processing unit for operating thereon to generate corresponding results in a digital data format, said processing unit including display means coupled thereto for displaying said data and command functions and said results in a human readable form, said first processing unit further including optical means for converting said digital data formatted results into atmospherically transmitted pulses of optical radiation within a predetermined optical frequency range;*

*at least one detached remote data processing unit having an associated keyboard for manually entering local data and command functions, a local processing means for receiving local data and command functions and for operating thereon to generate corresponding local results, a local display means coupled to said local processing means, said at least one remote data processing unit further including optical means for atmospherically transmitting pulses of optical radiation within the predetermined optical frequency range, said optical means converting received pulses into digitally formatted data and command functions for application to said local processing means, said local processing means causing said data and command functions to be displayed on said local display means;*

*said first data processing unit and each of said at least one detached remote data processing unit including means for operating its respective optical means in both a transmit and a receive mode for permitting atmospheric optical signal transmission between said detached remote data processing unit and said first data processing unit; and*

*means in each said data processing unit and said detached remote processing unit for selectively displaying data and command functions from its associated keyboard and from optically received pulses from the other of said first data processing unit and said at least one detached remote data processing unit.*

*6. The system of claim 5 wherein said means for operating in either a transmit and a receive mode comprises switching means mounted on each said first data processing unit and said at least one detached data processing unit for selectively placing said first data processing unit and said at least one detached data processing unit into one of a transmit and a receiving mode.*

*7. The system of claim 5 wherein said optical means comprises at least one infrared transmission element and at least one infrared receiving element.*

*8. A method for displaying common data at each of a plurality of data processing units in an optically linked data processing system, each of the processing units being adapted for operating on and displaying data generated internally and by one or more detached processing units, each of the processing units being positioned within a line of sight of others of the processing units, each processing unit including optical data receiving means for receiving optically encoded information and optical data transmitting means for atmospherically transmitting data as pulses of optically coded information, each processing unit further including a microcomputer for processing data, a keyboard for entering data and a display for exhibiting data, the method comprising the steps of:*

*generating electrical signals in one of the processing units representative of entered and processed data;*

*transforming the electrical signals to a series of electrical pulses;*

*applying the electrical pulses to an optical data transmitting means in the one of the processing units for generating a series of atmospherically transmitted optically encoded pulses;*

*receiving the atmospherically transmitted pulses with the optical receiving means in at least one other of the processing units and generating a series of electrical pulses representative of the received optically encoded pulses;*

*converting the series of electrical pulses to display signals suitable for display on the display of the at least one other of the processing units;*

*operating on the received electrical pulses in the at least one other of the processing units in accordance with data and command functions entered into the microcomputer associated with the at least one other of the processing units to obtain other processed data,*

*converting the other processed data into other electrical signals in a form suitable for conversion to other optically encoded signals; and*

*atmospherically transmitting the other optically encoded signals to at least another one of the processing units for displaying the other processed data thereat.*

*9. In an interactive data processing system comprising at least a first and a second microcomputer, each of said microcomputers having a data and a function command processing means, a keyboard for entering data and function commands into said processing means, and a display means coupled to said processing means for displaying data provided by said processing means, the improvement comprising at least first and second optical transmitting and receiving means connected to respective ones of the at least first and second microcomputers, each of the processing means being coupled to a corresponding one of said optical means for selectively transmitting and receiving data and command functions by atmospheric optical transmission between said microcomputers, each of said processing means displaying both received and transmitted data on its respective associated display means, and each of said processing means being responsive to data and command functions received via atmospheric optical transmission from the other of the processing means as though such data and command functions were entered from its respective associated keyboard.*

* * * * *